(12) United States Patent
Chen et al.

(10) Patent No.: US 9,388,889 B2
(45) Date of Patent: Jul. 12, 2016

(54) DEFLECTING DEVICE FOR MOTION GUIDE APPARATUS

(75) Inventors: Sinho Chen, Taichung (TW); Cheng Sheng Chen, Taichung (TW)

(73) Assignee: Hiwin Technologies Corp., Situn Taichung (TW)

(*) Notice: Subject to any disclaimer, the term of this patent is extended or adjusted under 35 U.S.C. 154(b) by 686 days.

(21) Appl. No.: 13/414,839

(22) Filed: Mar. 8, 2012

(65) Prior Publication Data
US 2012/0160048 A1 Jun. 28, 2012

Related U.S. Application Data

(63) Continuation-in-part of application No. 12/455,878, filed on Jun. 9, 2009, now abandoned.

(51) Int. Cl.
 *F16H 25/22* (2006.01)
(52) U.S. Cl.
 CPC ....... *F16H 25/2219* (2013.01); *Y10T 74/19772* (2015.01)

(58) Field of Classification Search
 CPC ................................................... F16H 25/2219
 See application file for complete search history.

(56) References Cited

U.S. PATENT DOCUMENTS

| 7,350,434 | B2 | 4/2008 | Nishimura et al. |
| 9,007,107 | B2 | 4/2015 | Cheng et al. |
| 2008/0115609 | A1 | 5/2008 | Tsou et al. |

*Primary Examiner* — Terence Boes
(74) *Attorney, Agent, or Firm* — Charles E. Baxley

(57) ABSTRACT

A motion guide device includes a ball nut attached onto a shaft and having helical grooves and a returning channel for forming an endless ball guiding passage and for receiving a number of ball bearing elements, two deflecting devices are engaged with the ball nut and each include a deflecting pathway communicative with the helical groove and the returning channel of the ball nut and each include a protrusion engaged with a recess of the ball nut for anchoring the deflecting devices to the ball nut, and the deflecting devices each include a connecting surface directed toward the helical groove of the ball nut for guiding the ball bearing elements to smoothly move between the helical groove of the ball nut and the deflecting pathways of the deflecting devices.

1 Claim, 5 Drawing Sheets

DEFLECTING DEVICE FOR MOTION GUIDE APPARATUS

The present invention is a continuation-in-part of U.S. patent application Ser. No. 12/455,878, filed 9 Jun. 2009, pending and to be abandoned.

BACKGROUND OF THE INVENTION

1. Field of the Invention

The present invention relates to a motion guide apparatus, such as a linear motion guide apparatus or a ball screw device, and more particularly to a motion guide apparatus including two movable members or a screw shaft and a ball nut movable relative to each other, and a deflecting device attached to one of the two movable members for suitably deflecting and guiding the ball bearing elements to move through an endless ball guiding passage in the ball screw device or between the two movable members.

2. Description of the Prior Art

Typical motion guide apparatuses, such as the linear motion guide apparatuses or the ball screw devices comprise two movable members rotatable or movable relative to each other, and a number of ball bearing elements disposed between the two movable members for facilitating the sliding movement between the two movable members, and two or more end deflecting elements attached to the ball nut and communicative with the helical groove portions of the screw shaft and the ball nut for forming an endless ball guiding passage in the ball screw device or between the two movable members and for slidably receiving a number of ball bearing elements.

For example, U.S. Pat. No. 7,350,434 to Nishimura et al; discloses one of the typical ball screw devices comprising a ball nut pivotally or rotatably coupled onto a screw shaft, and a helically running threaded channel provided between the screw shaft and the ball nut for receiving a number of loaded ball bearing elements and for facilitating the sliding movement between the screw shaft and the ball nut, and two or more end deflecting elements attached to the ball nut and communicative with the helical groove portions of the screw shaft and the ball nut for forming the endless helically running threaded channel in the ball screw device or between the screw shaft and the ball nut.

However, the deflecting channels in the deflecting elements include a circular cross section all through the length thereof and may not be suitably aligned with or flush with the helical groove portions or the endless helically running threaded channel of the screw shaft and the ball nut, and such that the loaded ball bearing elements may not be suitably guided to move through the endless helically running threaded channel of the screw shaft and the ball nut.

U.S. Patent Publication No. 2007/0221003 to Chen et al. discloses another typical ball screw device also comprising a ball nut pivotally or rotatably coupled onto a screw shaft, and a helically running threaded channel provided between the screw shaft and the ball nut for receiving a number of loaded ball bearing elements and for facilitating the sliding movement between the screw shaft and the ball nut, and two or more end deflecting elements attached to the ball nut and communicative with the helical groove portions of the screw shaft and the ball nut for forming the endless helically running threaded channel in the ball screw device or between the screw shaft and the ball nut.

However, the deflecting channels in the deflecting elements also include a circular cross section all through the length thereof and may not be suitably aligned with or flush with the helical groove portions or the endless helically running threaded channel of the screw shaft and the ball nut, and such that the loaded ball bearing elements may not be suitably guided to move through the endless helically running threaded channel of the screw shaft and the ball nut.

U.S. Patent Publication No. 2008/0115609 to Tsou et al. discloses a further typical ball screw device also comprising a ball nut pivotally or rotatably coupled onto a screw shaft, and a helically running threaded channel provided between the screw shaft and the ball nut for receiving a number of loaded ball bearing elements and for facilitating the sliding movement between the screw shaft and the ball nut, and two or more end deflecting elements attached to the ball nut and communicative with the helical groove portions of the screw shaft and the ball nut for forming the endless helically running threaded channel in the ball screw device or between the screw shaft and the ball nut.

However, the deflecting channels in the deflecting elements also include a circular cross section all through the length thereof and may not be suitably aligned with or flush with the helical groove portions or the endless helically running threaded channel of the screw shaft and the ball nut, and such that the loaded ball bearing elements may not be suitably guided to move through the endless helically running threaded channel of the screw shaft and the ball nut.

The present invention has arisen to mitigate and/or obviate the afore-described disadvantages of the conventional motion guide apparatuses.

SUMMARY OF THE INVENTION

The primary objective of the present invention is to provide a motion guide apparatus including two movable members movable relative to each other, and a deflecting device attached to one of the two movable members or a screw shaft and a ball nut for suitably deflecting and guiding the ball bearing elements to move through an endless ball guiding passage in the ball screw device or between the two movable members.

In accordance with one aspect of the invention, there is provided a motion guide apparatus comprising an elongated shaft including a helical groove formed on an outer peripheral surface thereof, a ball nut movably attached onto the elongated shaft, and including a bore formed therein for receiving the elongated shaft, and including a helical groove formed therein, and including a returning channel longitudinally formed therein and communicative with the helical groove of the ball nut, and including two end depressions formed therein and communicative with the returning channel of the ball nut, two deflecting devices engaged with the depressions of the ball nut respectively and each including a deflecting pathway formed therein and communicative with the helical groove and the returning channel of the ball nut for forming an endless ball guiding passage between the ball nut and the elongated shaft, and a number of ball bearing elements received and engaged with the endless ball guiding passage, the ball nut includes a recess formed therein and communicative with each of the depressions of the ball nut, and the deflecting devices each include a protrusion extended therefrom and engaged with the recess of the ball nut for anchoring and positioning the deflecting devices to the ball nut, and the deflecting devices each include a connecting surface formed in the protrusion and directed toward the helical groove of the ball nut for guiding the ball bearing elements to smoothly move between the helical groove of the ball nut and the deflecting pathways of the deflecting devices. The deflecting pathways of the deflecting devices each include a curved segment having a U-shaped cross section and directed toward and communicative with the returning channel of the ball nut for guiding the ball bearing elements to move between the returning channel of the ball nut and the curved segments of the deflecting pathways of the deflecting devices, and each include a longitudinal segment having a circular cross section and directed toward and communicative with the helical groove of the ball nut for guiding the ball bearing elements to move between the helical groove of the ball nut and the longitudinal segments of the deflecting pathways of the deflecting devices.

The deflecting devices each include a curved deflecting tongue provided therein for defining a portion of the longitudinal segment of the deflecting pathway of the deflecting device and for engaging with and positioning the ball bearing elements to the deflecting device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
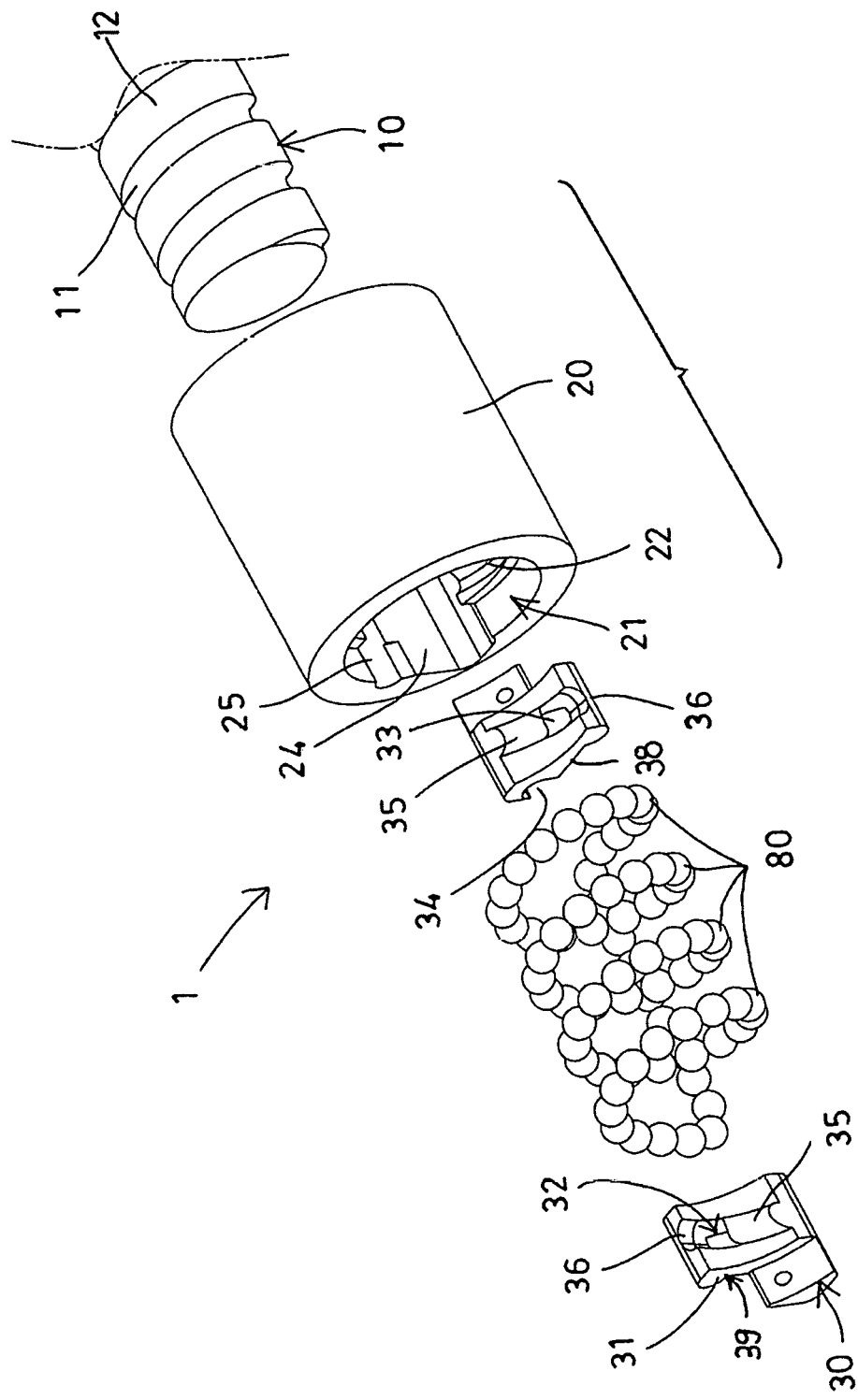
FIG. 1 is a partial exploded view of a motion guide apparatus in accordance with the present invention.
Figure 3:
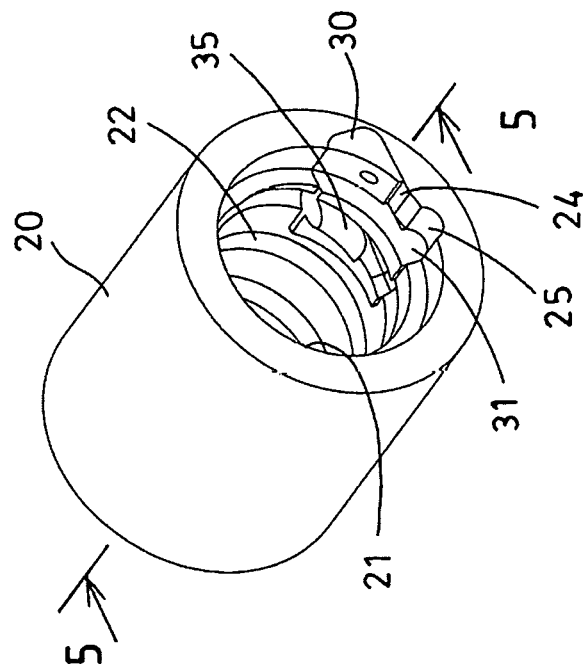
FIG. 3 is a perspective view of a ball nut of the motion guide apparatus.
Figure 2:
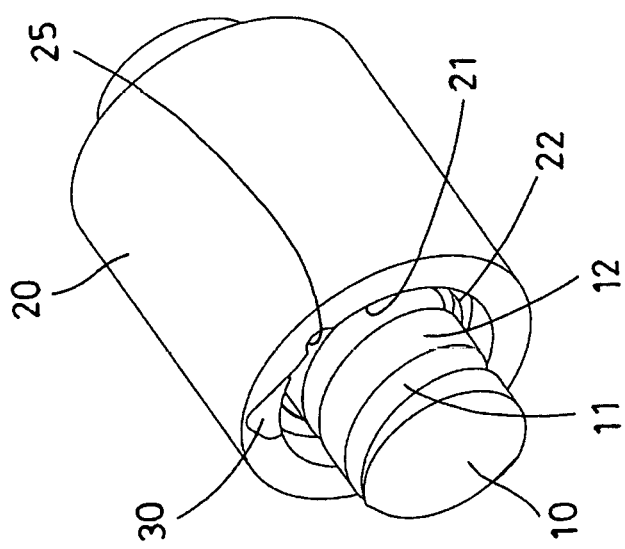
FIG. 2 is a partial perspective view of the motion guide apparatus.
Figure 5:
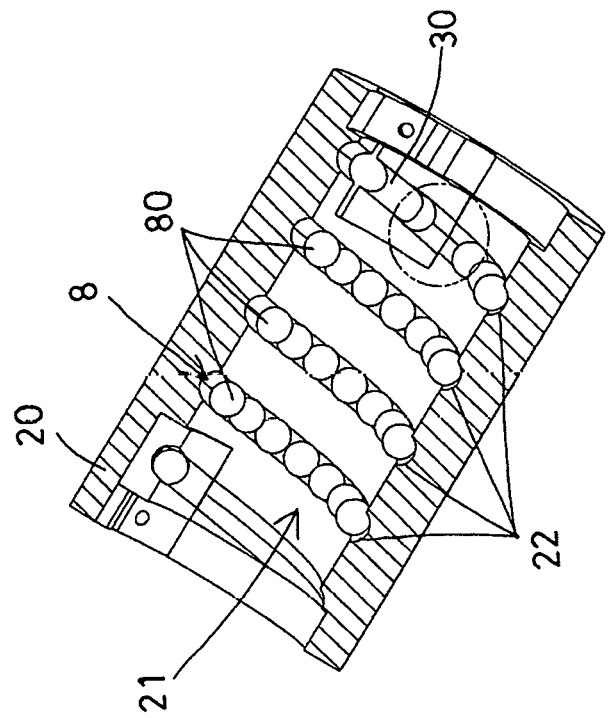
FIG. 5 is a cross sectional view of the motion guide apparatus taken along lines 5-5 of FIG. 3.
Figure 4:
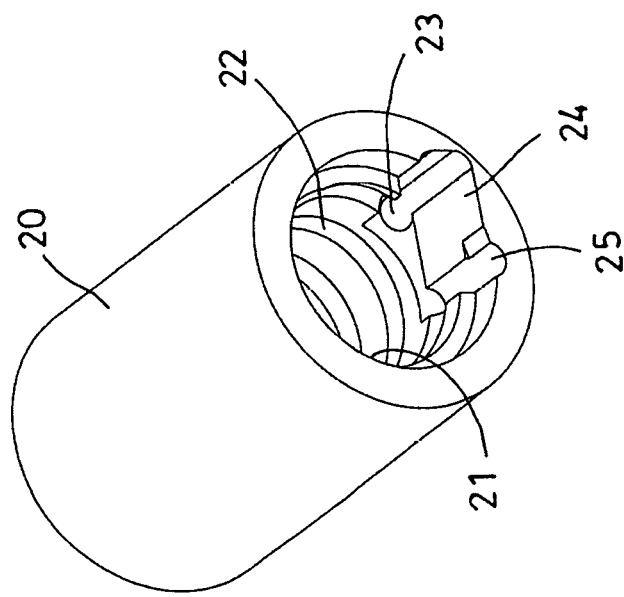
FIG. 4 is a perspective view similar to FIG. 3, in which the deflecting device has been removed for showing the inner structure of the ball nut.
Figure 6:
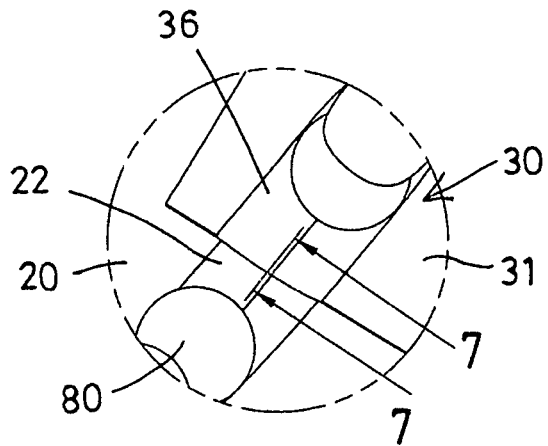
FIG. 6 is an enlarged partial cross sectional view of the motion guide apparatus as shown in FIG. 5.
Figure 7:
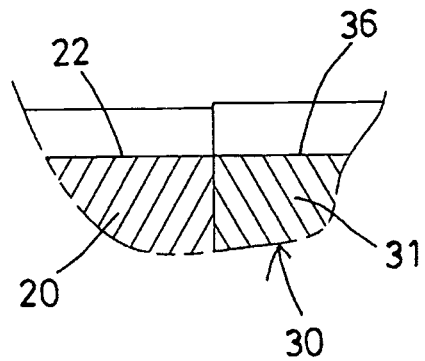
FIG. 7 is another enlarged partial cross sectional view of the motion guide apparatus taken along lines 7-7 of FIG. 6.
Figure 8:
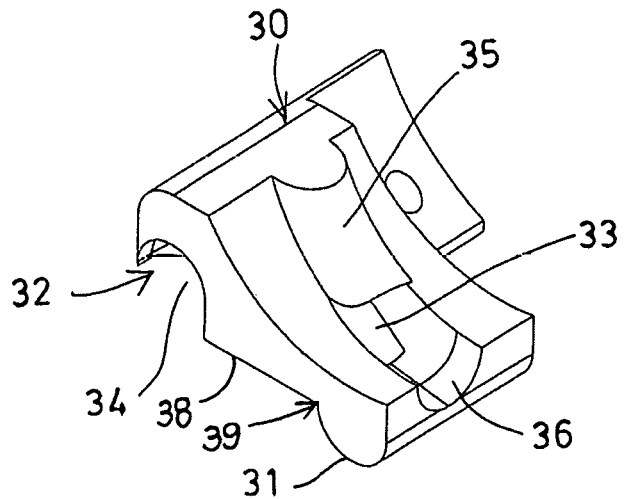
FIG. 8 is a perspective view illustrating the deflecting device of the motion guide apparatus.

Referring to the drawings, and initially to FIGS. 1-5, a motion guide apparatus 1 in accordance with the present invention, such as a ball screw device 1, comprises an elongated bolt or screw shaft 10 including a number of helical threaded portions or grooves 11 formed on the outer peripheral portion thereof, or formed in the outer peripheral surface 12 thereof, and a movable member, such as a ball nut 20 including a screw hole or bore 21 formed therein for receiving or engaging with the elongated screw shaft 10, and the screw hole or bore 21 of the ball nut 20 is formed or defined by a number of helical threaded portions or grooves 22 for threading or engaging or aligning with the helical threaded portions or grooves 11 of the screw shaft 10, and for forming an endless multiple-turn, helical raceway or ball guiding passage 8 (FIG. 5) between the screw shaft 10 and the ball nut 20, and for slidably receiving a number of ball bearing elements 80 and for facilitating the sliding or rotational movement between the two movable members 10, 20 or the screw shaft 10 and the ball nut 20.

The ball nut 20 includes a returning channel 23 longitudinally or axially formed in the outer peripheral portion thereof, and intersecting or communicating with helical threaded portions or grooves 22 or the ball guiding passage 8, and includes two depressions 24 formed therein, such as formed in the two side or end portions of the ball nut 20, and arranged and intersected or communicated with the returning channel 23 of the ball nut 20, and the depressions 24 the ball nut 20 are each provided for receiving or attaching or engaging with a deflecting device 30 which is engaged with or attached or mounted or secured to the ball nut 20 with latches or fasteners (not shown) for guiding or deflecting or returning the ball bearing elements 80 to move cyclically in the endless multiple-turn, helical raceway or ball guiding passage 8 of the ball screw device 1. The above-described structure is typical and will not be described in further details.

The ball nut 20 further includes a recess 25 formed therein and communicative with each of the depressions 24 of the ball nut 20, and the deflecting devices 30 each include a protrusion 31 extended downwardly from a bottom surface of the respective deflecting device 30 for forming a step structure 39 in the bottom surface 38 of the deflecting device 30, and engaged with the recess 25 of the ball nut 20 for stably anchoring and positioning the deflecting devices 30 to the ball nut 20 and for preventing the deflecting devices 30 from moving sidewise or laterally relative to the ball nut 20. As shown in FIGS. 1 and 5-10, the deflecting devices 30 each include a deflecting pathway 32 formed therein and formed or defined by a longitudinal segment 33 and a curved segment 34, and each include a curved or deflecting tongue 35 provided therein (FIGS. 1, 3, and 8) for forming or defining a portion of the longitudinal segment 33 and/or the curved segment 34 of the deflecting pathway 32 of the deflecting device 30 and for suitably and rotatably and/or movably receiving or engaging with or positioning the ball bearing elements 80 therein. The deflecting tongue 35 is offset from the protrusion 31 of the deflecting device 30, as best shown in the bottom plan view of the deflecting device (FIG. 9), for allowing the deflecting device 30 to be formed as a one-integral piece and to be easily removed or disengaged from the mold device (not illustrated).

Figure 10:
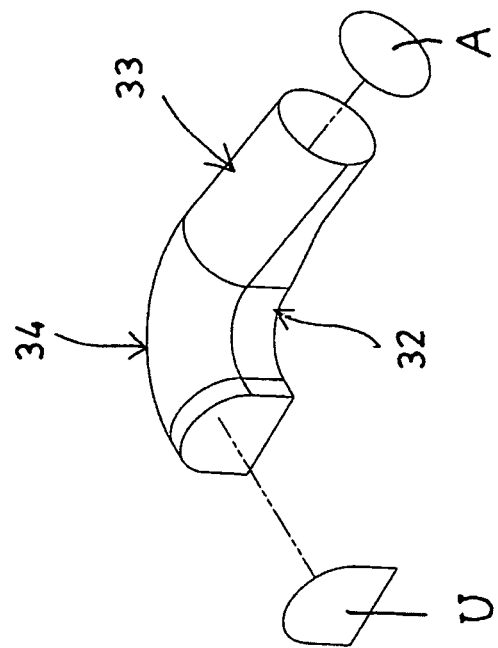
FIG. 10 is a perspective view illustrating the deflecting channel of the deflecting device of the motion guide apparatus as shown in FIGS. 8 and 9.
Figure 9:
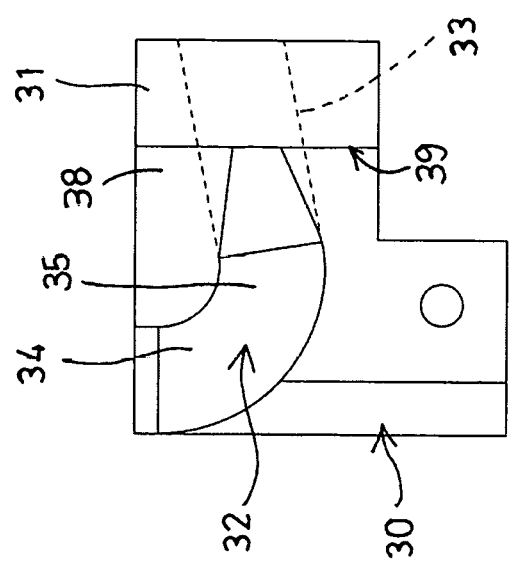
FIG. 9 is a bottom plan schematic view of the deflecting device of the motion guide apparatus as shown in FIG. 8.

As also shown in FIGS. 9 and 10, the curved segment 34 of the deflecting pathway 32 of the deflecting device 30 includes a substantially U-shaped cross section (U), and directed toward or aligned or communicative with the returning channel 23 of the ball nut 20 for suitably deflecting and guiding the ball bearing elements 80 to move between the returning channel 23 of the ball nut 20 and the curved segments 34 of the deflecting pathways 32 of the deflecting devices 30, and the longitudinal segment 33 of the deflecting pathway 32 of the deflecting device 30 includes a substantially circular or O-shaped cross section (A), and directed toward or aligned or communicative with the helical groove 22 of the ball nut 20 for suitably deflecting and guiding the ball bearing elements 80 to move between the helical groove 22 of the ball nut 20 and the longitudinal segments 33 of the deflecting pathways 32 of the deflecting devices 30.

As best shown in FIG. 10, the U-shaped cross section (U) of the curved segment 34 of the deflecting pathway 32 of the deflecting device 30 includes the O-shaped cross section (A) of the longitudinal segment 33 of the deflecting pathway 32 of the deflecting device 30 inscribed therein, or the O-shaped cross section (A) of the longitudinal segment 33 of the deflecting pathway 32 of the deflecting device 30 is tangent to the U-shaped cross section (U) of the curved segment 34 of the deflecting pathway 32 of the deflecting device 30. The longitudinal segment 33 of the deflecting pathway 32 of the deflecting device 30 is tapered or inclined from the U-shaped cross section (U) of the curved segment 34 toward the O-shaped cross section (A) (FIG. 10).

As shown in FIGS. 5-8, the deflecting devices 30 each further include a curved guiding or joining or connecting surface 36 formed therein, such as formed in the protrusion 31 of the deflecting devices 30 and directed toward or aligned with the helical groove 22 of the ball nut 20 and arranged for allowing the connecting surfaces 36 of the deflecting devices 30 to be aligned with and flush with the helical groove 22 of the ball nut 20 and for allowing the ball bearing elements 80 to smoothly move between the helical groove 22 of the ball nut 20 and the longitudinal segments 33 of the deflecting pathways 32 of the deflecting devices 30, and thus for suitably deflecting and guiding the ball bearing elements 80 to move between the helical groove 22 of the ball nut 20 and the longitudinal segments 33 of the deflecting pathways 32 of the deflecting devices 30.

Accordingly, the motion guide apparatus in accordance with the present invention includes two movable members movable relative to each other, and a deflecting device attached to one of the two movable members or a screw shaft and a ball nut for suitably deflecting and guiding the ball bearing elements to move through an endless ball guiding passage in the ball screw device or between the two movable members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A motion guide apparatus comprising:
an elongated shaft including a helical groove formed on an outer peripheral surface thereof,
a ball nut movably attached onto said elongated shaft, and including a bore formed therein for receiving said elongated shaft, and including a helical groove formed therein, and including a returning channel longitudinally formed therein and communicative with said helical groove of said ball nut, and including two end depressions formed therein and communicative with said returning channel of said ball nut,
two deflecting devices engaged with said depressions of said ball nut respectively and each including a deflecting pathway formed therein and communicative with said helical groove and said returning channel of said ball nut for forming an endless ball guiding passage between said ball nut and said elongated shaft, and
a plurality of ball bearing elements received and engaged with said endless ball guiding passage,
wherein said ball nut includes two recesses formed therein and communicative with said depressions of said ball nut respectfully, and said deflecting devices each include a protrusion extended downwardly from a bottom surface of the deflecting device for forming a step structure in the bottom surface of the deflecting device, and said protrusions of said deflecting devices are engaged with said recesses of said ball nut respectfully for anchoring and positioning said deflecting devices to said ball nut, and said deflecting devices each include a connecting surface formed in said protrusion of said deflecting device and directed toward said helical groove of said ball nut for guiding said ball bearing elements to smoothly move between said helical groove of said ball nut and said deflecting pathways of said deflecting devices,
wherein said deflecting pathways of said deflecting devices each include a curved segment having a U-shaped cross section (U) and directed toward and communicative with said returning channel of said ball nut for guiding said ball bearing elements to move between said returning channel of said ball nut and said curved segments of said deflecting pathways of said deflecting devices, and each include a longitudinal segment directed toward and communicative with said helical groove of said ball nut for guiding said ball bearing elements to move between said helical groove of said ball nut and said longitudinal segments of said deflecting pathways of said deflecting devices, said longitudinal segment of said deflecting pathway of said deflecting device have the same radius as that of said U-shaped cross section (U) of said curved segment of said deflecting pathway of said deflecting device, and said longitudinal segment of said deflecting pathway of said deflecting device is inclined from said U-shaped cross section (U) of said curved segment toward an O-shaped cross section (A), and
wherein said deflecting devices each include a curved deflecting tongue provided therein for defining a portion of said longitudinal segment of said deflecting pathway of said deflecting device and for engaging with and positioning said ball bearing elements to said deflecting device, said deflecting tongue is offset from the protrusion of the deflecting device, as seen from a bottom plan view of the deflecting device.

* * * * *